US006542741B2

(12) United States Patent
Wallstedt et al.

(10) Patent No.: US 6,542,741 B2
(45) Date of Patent: *Apr. 1, 2003

(54) METHOD OF ESTABLISHING AN ADAPTIVE PUBLIC NEIGHBOR CELL LIST FOR MOBILE STATIONS OF A PRIVATE CELLULAR SYSTEM

(75) Inventors: Kenneth W. Wallstedt, Chapel Hill, NC (US); Mats Höglund, Cary, NC (US)

(73) Assignee: Ericsson, Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,914

(22) Filed: Jul. 1, 1999

(65) Prior Publication Data

US 2002/0193111 A1 Dec. 19, 2002

(51) Int. Cl.[7] .................................................. H04Q 7/20
(52) U.S. Cl. ...................... 455/434; 455/422; 455/436; 455/442
(58) Field of Search .......................... 455/63, 434, 422, 455/32.1, 515, 435, 436, 437, 438, 439, 440, 442, 443, 444, 33.1, 33.2, 414, 412, 432, 448

(56) References Cited

U.S. PATENT DOCUMENTS

| 5,574,996 A | * | 11/1996 | Raith ...................... 455/161.3 |
| 5,640,677 A | * | 6/1997 | Karlsson ...................... 455/434 |
| 5,722,073 A | * | 2/1998 | Wallstedt et al. ............ 455/437 |
| 5,734,980 A | * | 3/1998 | Hooper et al. ............... 455/434 |
| 5,845,211 A | * | 12/1998 | Roach, Jr. .................... 455/436 |
| 5,854,981 A | | 12/1998 | Wallstedt et al. |
| 5,884,145 A | * | 3/1999 | Haartsen ...................... 455/63 |
| 5,890,064 A | * | 3/1999 | Widergen et al. ........... 455/445 |
| 5,903,832 A | * | 5/1999 | Seppanen et al. ........... 455/414 |
| 5,903,839 A | * | 5/1999 | Mattila ........................ 455/434 |
| 5,920,818 A | * | 7/1999 | Frodigh et al. .............. 455/443 |
| 5,953,320 A | * | 9/1999 | Williamson et al. ......... 370/252 |
| 5,982,758 A | * | 11/1999 | Hamdy ........................ 370/331 |
| 5,987,332 A | * | 11/1999 | Gettleman et al. ........... 455/518 |
| 6,032,046 A | * | 2/2000 | Nakano ....................... 455/450 |
| 6,058,302 A | * | 5/2000 | Westerberg .................. 455/411 |
| 6,067,460 A | * | 5/2000 | Alanara et al. .............. 455/574 |
| 6,119,002 A | * | 9/2000 | Alanara ....................... 455/434 |
| 6,125,280 A | * | 9/2000 | Grandhi et al. .............. 455/446 |
| 6,167,282 A | * | 12/2000 | Hunsberger .................. 455/513 |
| 6,181,946 B1 | * | 1/2001 | Gettlemen et al. ........... 455/509 |
| 6,188,904 B1 | * | 2/2001 | Marsan ........................ 455/450 |
| 6,192,244 B1 | * | 2/2001 | Abbadessa ................... 455/436 |
| 6,201,968 B1 | * | 3/2001 | Ostroff et al. ............... 455/436 |
| 6,263,211 B1 | * | 7/2001 | Brunner et al. .............. 455/464 |
| 6,289,220 B1 | * | 9/2001 | Spear .......................... 455/436 |
| 6,360,098 B1 | * | 3/2002 | Ganesh et al. ............... 455/436 |

* cited by examiner

*Primary Examiner*—Daniel Hunter
*Assistant Examiner*—Pablo N Tran
(74) *Attorney, Agent, or Firm*—Moore & Van Allen, PLLC; Steven B. Phillips

(57) ABSTRACT

A method for a Digital Wireless Office System (DWOS) to establish and update a public neighbor cell list for roaming mobile stations is disclosed. Transmissions of the base stations of public cells are scanned by DWOS scanners. Information from the Digital Control Channels and Broadcast Control Channels is used in formulating the list.

12 Claims, 1 Drawing Sheet

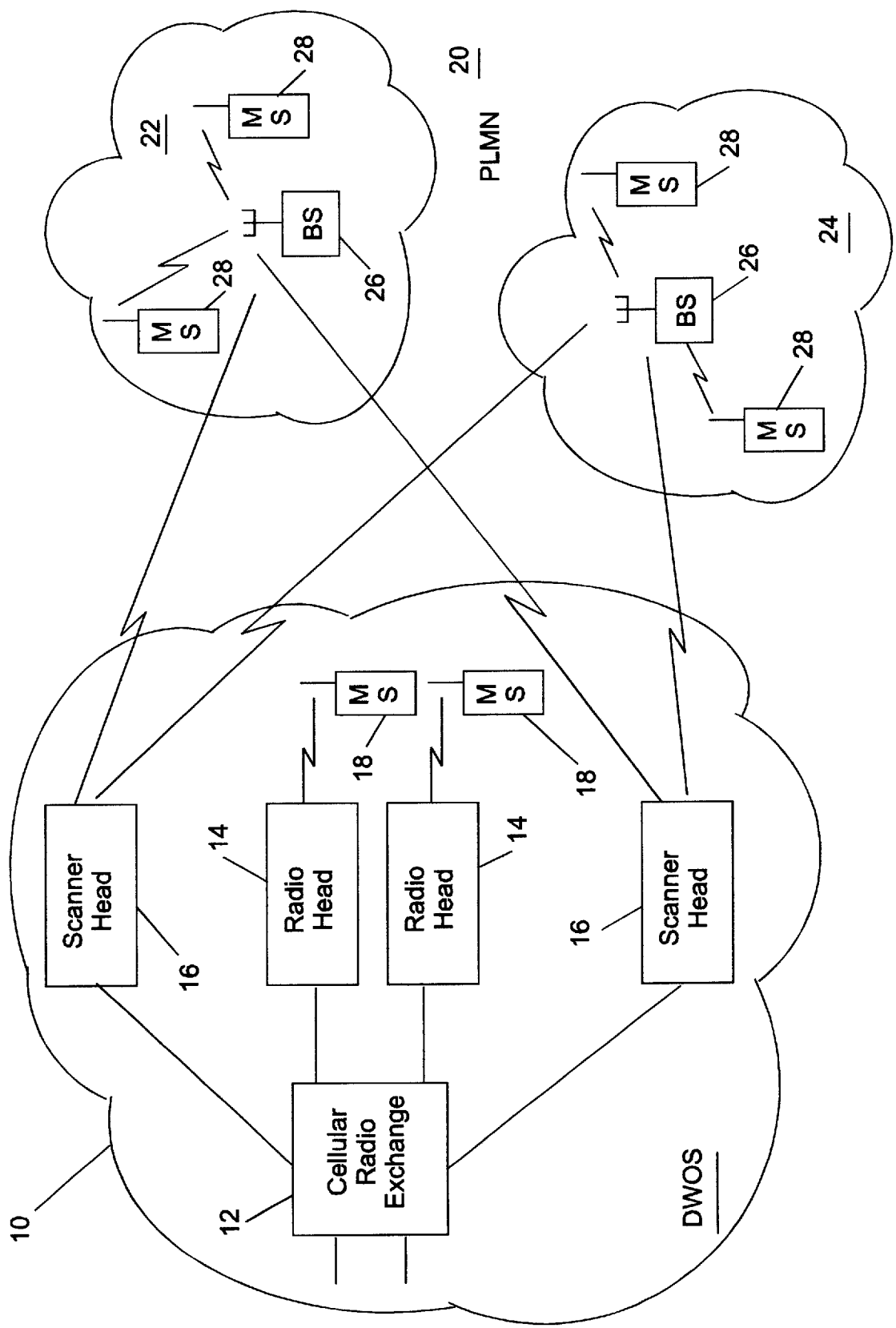

METHOD OF ESTABLISHING AN ADAPTIVE PUBLIC NEIGHBOR CELL LIST FOR MOBILE STATIONS OF A PRIVATE CELLULAR SYSTEM

FIELD OF THE INVENTION

This invention relates to a private cellular system, as a wireless office system. More particularly, the invention relates to a method for establishing and updating a neighbor cell list used by mobile stations of the private system for cell selection.

BACKGROUND OF THE INVENTION

A mobile station (MS), in accordance with one aspect of ANSI-136rev.A, stores in memory PSP/POF (Public Service Profiles/Private Operating Frequencies) identities. The PSP/POF identities are used by the MS, when camped on a public digital control channel (DCCH) to find and connect automatically with a private system. The MS searches for a POF (the frequency of the DCCH of the private system) when it is camped on a public DCCH which it determines to be a stored PSP. This avoids an undesirable manual search by the MS user.

A digital wireless office system (DWOS) is a private mobile communication system that provides an extension to mobile stations in many office environments. Mobile cellular phones used in DWOS are capable of roaming between the DWOS and a public cellular system which has one or more cells in the area, sometimes referred to herein as neighbor cells or public neighbor cells. A roaming mobile station requires information regarding the Digital Control Channels (DCCH) of the neighbor cells. The PSPs stored in an MS should represent the public neighbor cells most likely for the MS to camp on when outside of DWOS. The method described herein develops information concerning the control channels of neighbor cells which information is then transmitted to and stored in the mobile stations.

BRIEF SUMMARY OF THE INVENTION

The method disclosed herein establishes and updates the neighbor cell list of a DWOS. The neighbor cell list is used by MSs to update their PSP/POF lists.

More particularly, one feature of the method is that the DWOS scans transmissions from the neighbor cell base stations, identifies digital control channels from the scanned transmissions and selects the most relevant of the identified control channels for the list. The list is then transmitted to the DWOS mobile stations.

Another feature of the method is that identified control channels are validated; and those that are invalid are discarded.

A further feature is that the most relevant control channels are selected on the basis of the received signal strength.

Yet another feature is that the list is based on more than one scan and selection to avoid changes in the list for temporary or transient control channel conditions.

Still another feature of the method is that where public systems operate on two or more bands an attempt is made to identify and list at least one channel per band.

A further feature is where the public system mobile stations have special information for cell selection (e.g. do not camp on a competitor's network), this information is incorporated in the criteria for establishing the list of neighbor cells.

Other features and advantages of the invention will be apparent from the following description and from the drawings.

BRIEF DESCRIPTION OF THE DRAWING

The FIGURE is a simplified block diagram of a wireless office system and two neighbor cells of a public land mobile network.

DETAILED DESCRIPTION OF THE INVENTION

A private digital mobile communication system, here a digital wireless office system (DWOS) may provide a mobile extension of the Private Branch Exchange (PBX) of an office. Digital cellular phones or mobile stations (MS) are usable in the office environment. The DWOS coexists with a public cellular network and mobile stations may roam between the DWOS and the public network. Each mobile station of the DWOS stores a list of neighbor cells with information on the public cells, PSPs, in the public cellular network, and information on the private system DWOS POFs. This list is used by the MS to determine when to search for DWOS and what frequencies to scan. The list information is assembled and updated by DWOS and communicated to the various MSs each time the MS camps on the DWOS, as provided in ANSI-136rev.A. The method for assembling the information in the list will be described below.

An exemplary DWOS 10, illustrated in the FIGURE, includes a Cellular Radio Exchange (CRE) 12 which controls the radio network of the DWOS and the radio channels between DWOS and the MSs. A central processing unit (CPU), as a digital signal processor and associated memory, is incorporated in CRE 12 and controls the operation of DWOS. Radio Heads (RH) 14 and Scanner Heads (SH) 16 are connected with the CRE 12 by cables. Radio heads 14 include transceivers through which mobile stations 18 communicate with the CRE.

The Public Land Mobile Network (PLMN) 20 is divided into operating cells, two of which are shown at 22 and 24 in the FIGURE. The cells are in physical proximity to DWOS and are sometimes referred to herein as neighbor cells. Each cell has a base station (BS) 26 through which mobile stations 28 communicate.

Scanner heads 16 of DWOS 10 monitor transmissions of base stations 26.

DWOS scanner heads 16 each include a dedicated downlink scanning receiver which scans the frequencies transmitted by neighboring cell base stations 26 and detects information used in establishing and updating the neighbor cell list for DWOS mobile stations 18. Digital Control Channel (DCCH) transmissions of base stations 26 are detected and Broadcast Control Channel (BCCH) messages are read. The read information includes:

(A) System Identification (SID);
(B) System Operator Code (SOC);
(C) Mobile Country Code (MCC);
(D) Digital Verification Color Code (DVCC);
(E) Signal Strength Sufficient (SS_SUFF);
(F) Received Signal Strength Acceptable Minimum (RSS_ACC_MIN);
(G) Mobile Station Acceptable Power (MS_ACC_PWR);
(H) Network Type.

The channel identification, i.e. channel number, and the Received Signal Strength Indicator (RSSI) together with the information read from the BCCH are reported to the CPU which verifies and analyzes the information.

The system or systems where public neighbors can be found is specified by MCC/SOC/SID triplets. One or more DCCHs from one or more public networks with the correct MCC/SOC/SID are candidates to be included in the neighbor cell list. The measured and read information is analyzed according to an algorithim described below.

The read information for each DCCH is checked for validity by determining that the signal is from a public network and that the SID/SOC/MCC triplet information matches that set by the system operator. A DCCH which is not valid is ignored.

The information of each valid DCCH is compared to find the most relevant public neighbors and they are divided into sets:

Set A—The strongest valid DCCH and its received signal strength (RSS) from each scanner head. The size of set A will be up to the number of scanner heads in the system. A DCCH can be strongest in more than one scanner head and can, therefore, be multiple times in set A.

Set B—Set B is set A reduced so that a DCCH is represented only once, from the scanner head which received it the strongest.

If the size of set B is greater than or equal to the maximum number of public neighbor cells, the strongest DCCHs in set B will be the New Set of most relevant public neighbors. If the size of set B is less than the maximum number of public neighbors, a Set C is established taking the second strongest DCCH from each scanning head and calculating the difference in RSSI with respect to that of the strongest DCCH in that scanning head. The second strongest DCCHs are sorted based on the differences in RSSI. The DCCHs that have the least differences form set C which is then added to set B. If the size of set B plus set C is less than the maximum number of public neighbors, the process is continued with the third strongest DCCHs. The maximum size of the New Set is the maximum number of public neighbors. If this size is not achieved with the third strongest DCCHs, the process is continued with the fourth strongest, fifth strongest, etc. This is done to maximize the probability of including the public neighbor a mobile station is camping on when entering the DWOS.

When the New Set is complete, the neighbor cell list in DWOS is updated. It is desirable to include in the public neighbor cell list information regarding the control channels of the DWOS cell for use by roaming mobile stations returning to the DWOS cell. Both the DWOS active DCCH and DCCH candidates are included with the New Set in the DWOS neighbor cell list.

The WOS CPU develops the following information for the neighbor cell list:

| | |
|---|---|
| A. | Neighbor cell information elements for public neighbor cell |
| | (1) Channel |
| | (2) Digital Verification Color Code (DVCC) |
| | (3) SS_SUFF |
| | (4) MS_ACC_PWR |
| | (5) RSS_ACC_MIN |
| B. | Neighbor cell information element for own (DWOS) cell |
| | (1) Channel |

The Adaptive Public Neighbor Cell List APNL described above is broadcast by the WOS to each of the mobile stations 18 associated with WOS. Thus the list is updated as changes occur in the cells.

The detected and measured system conditions on which the APNL is based are sometimes subject to short term or transient variations. For example, a weak public DCCH may go on and off the PSP list. To avoid short-term additions to or removal from the list of public channels, the results of the data analysis are filtered. For example, if a PSP is successfully decoded in two of five successive scanner readings, it will qualify for addition to the list and the signal strength comparison is based on an average of the successful readings.

If all of the strong public DCCHs are found in one frequency band, there is a risk of filling the neighbor cell list with PSPs which are undesirable. DWOS cannot readily find out the public system parameter settings or figure out where mobile stations are camped in the public system cells. Manual entry of the public system and mobile station settings is undesirable for an automatically operating DWOS. Accordingly, where the system utilizes three public bands, at least one PSP per band is designated. If there are two public frequency bands, two PSPs per band are designated. In effect, this establishes an adaptive list for each frequency band.

A public cell system may cause mobile stations to camp on a cell where the base station signal is not received the strongest by the mobile station. This problem is minimized by supplementing the list established by the method described above in a manner similar to the procedure used by a mobile station for cell selection and reselection. The DWOS will take into consideration in formulating the adaptive list the fact that the public system pushes mobile stations to certain cells. A mobile station simulator is implemented in the logic of the WOS CPU. Information from scanning heads 18 for each of the identified neighboring control channels is supplied to the simulator logic. The cells where the mobile stations are likely to end up are determined by the simulator logic and added to the adaptive neighbor cell list.

Mobile stations are sometimes provided with an intelligent roaming data base (IRDB) which provides for priorities in cell selection. For example, a roaming mobile station may be programmed to prefer one cellular system over another, or not to camp on a competitive network. The DWOS CPU can utilize such priority information in formulating the adaptive neighbor cell list. If mobile stations are provided with the IRDB information over the air, DWOS can receive the information from the public network over a wire link or by listening to the over-the-air programming via a scanner head 16. Alternatively, DWOS can read the IRDB information from a mobile station camped on DWOS. The IRDB information is preferably analyzed by DWOS with the MS simulator described above.

We claim:

1. A method of establishing a list of public neighbor cells for a private mobile communication system, said method comprising:

scanning for transmissions from a plurality of public neighbor cell base stations a plurality of times;

identifying digital control channels of said plurality of public neighbor cell base stations from said transmissions;

forming a first set of digital control channels comprising those digital control channels with the greatest signal strengths from each of said plurality of scans of said plurality of public neighbor base stations; and selecting the most relevant of said digital control channels for said list by forming a second set of digital control channels comprising only those digital control channels with the greatest signal strengths from said first set of digital control channels, wherein said second set of digital control channels is formed by adding digital control channels of decreasing signal strength if the number of digital control channels in said second set of digital control channels is less than the number of public neighbor cells.

2. The method of claim 1 further comprising checking the validity of digital control channels by verifying that digital control channel parameters correspond to parameters set by said private mobile communications system.

3. The method of claim 2 wherein said parameters correspond to system identification, system operator code, and mobile country code.

4. The method of claim 1, wherein selecting the most relevant of said digital control channels further comprises selecting a digital control channel from each of a plurality of frequency bands used by each of said plurality of public neighbor cell base stations.

5. The method of claim 2, wherein selecting the most relevant of said digital control channels further comprises selecting a digital control channel from each of a plurality of frequency bands used by each of said plurality of public neighbor cell base stations.

6. The method of claim 3, wherein selecting the most relevant of said digital control channels further comprises selecting a digital control channel from each of a plurality of frequency bands used by each of said plurality of public neighbor cell base stations.

7. A private mobile communication system, comprising:
- a cellular radio exchange comprising a central processing unit;
- at least one radio head controlled by said cellular radio exchange, said at least one radio head operable to communicate with at least one mobile station associated with said private mobile communication system; and
- at least one scanning head controllable by said cellular radio exchange, said at least one scanning head operable to scan for transmissions by public neighbor cell base stations a plurality of times in order to establish a list of said public neighbor cell base stations;
- wherein said central processing unit is programmed to form a first set of digital control channels comprising those digital control channels with the greatest signal strengths from each of said plurality of scans and select the most relevant of said digital control channels for said list by forming a second set of digital control channels comprising only those digital control channels with the greatest signal strengths from said first set of digital control channels by adding digital control channels of decreasing signal strength if and when the number of digital control channels in said second set of digital control channels is less than the number of public neighbor cells.

8. The system of claim 7 where said the central processing unit is further programmed to check the validity of digital control channels by verifying that digital control channel parameters correspond to parameters set by said private mobile communications system.

9. The system of claim 8 wherein said parameters correspond to system identification, system operator code, and mobile county code.

10. The system of claim 7, wherein selecting the most relevant of said digital control channels is accomplished at least in part by selecting a digital control channel from each of a plurality of frequency bands used by each of said public neighbor cell base stations.

11. The system of claim 8, wherein selecting the most relevant of said digital control channels is accomplished at least in part by selecting a digital control channel from each of a plurality of frequency bands used by each of said public neighbor cell base stations.

12. The system of claim 9, wherein selecting the most relevant of said digital control channels is accomplished at least in part by selecting a digital control channel from each of a plurality of frequency bands used by each of said public neighbor cell base stations.

* * * * *